United States Patent [19]

Meloni et al.

[11] Patent Number: 4,787,950

[45] Date of Patent: Nov. 29, 1988

[54] METHOD FOR FABRICATING IMPRINTED TICKET WITH SCRATCH-OFF COATING

[75] Inventors: Robert Meloni, Baltimore; Robert Tegtmeier, Phoenix, both of Md. 21131

[73] Assignee: General Instrument Corp., N.Y.

[21] Appl. No.: 41,775

[22] Filed: Apr. 22, 1987

Related U.S. Application Data

[62] Division of Ser. No. 912,915, Sep. 29, 1986, Pat. No. 4,738,473.

[51] Int. Cl.[4] ........................ B32B 31/00; F16L 13/04

[52] U.S. Cl. .................................... 156/249; 156/277; 156/541; 283/903

[58] Field of Search ............... 156/249, 247, 248, 237, 156/238, 239, 277, 303, 306.6, 63, 540, 541, DIG. 44, DIG. 49, 384, 387; 283/101, 108, 903, 111; 270/1.1; 428/40, 352, 915

[56] References Cited

U.S. PATENT DOCUMENTS

| | | | |
|---|---|---|---|
| 3,631,617 | 1/1972 | Pekko | 283/108 |
| 3,891,242 | 6/1975 | Arnold et al. | 283/108 |
| 3,945,870 | 3/1976 | Johusen | 156/249 |
| 4,174,857 | 11/1979 | Koza | 283/903 |
| 4,255,220 | 3/1981 | Kucheck et al. | 156/249 |
| 4,398,708 | 8/1983 | Goldman et al. | 283/102 |
| 4,705,301 | 11/1987 | Dojel | 283/903 |
| 4,740,016 | 4/1988 | Konecay et al. | 283/903 |

FOREIGN PATENT DOCUMENTS

| | | | |
|---|---|---|---|
| 2075918 | 11/1981 | United Kingdom | 283/903 |
| 2085308 | 4/1982 | United Kingdom | 283/903 |

*Primary Examiner*—Michael W. Ball
*Assistant Examiner*—Louis Falasco
*Attorney, Agent, or Firm*—James & Franklin

[57] ABSTRACT

Blank tickets, for use in an instant lottery game or the like, can be imprinted in a secure manner in an enclosed point of sale ticket-issuing apparatus under the control of a central computer. Prior to exposure of the ticket, an adhesive-backed sheet with a scratch-off material coating on areas aligned with the printing is applied to the surface of the ticket. The adhesive will cause obvious damage to the ticket to void same if an attampt is made to remove the label.

3 Claims, 5 Drawing Sheets

FIG. 1
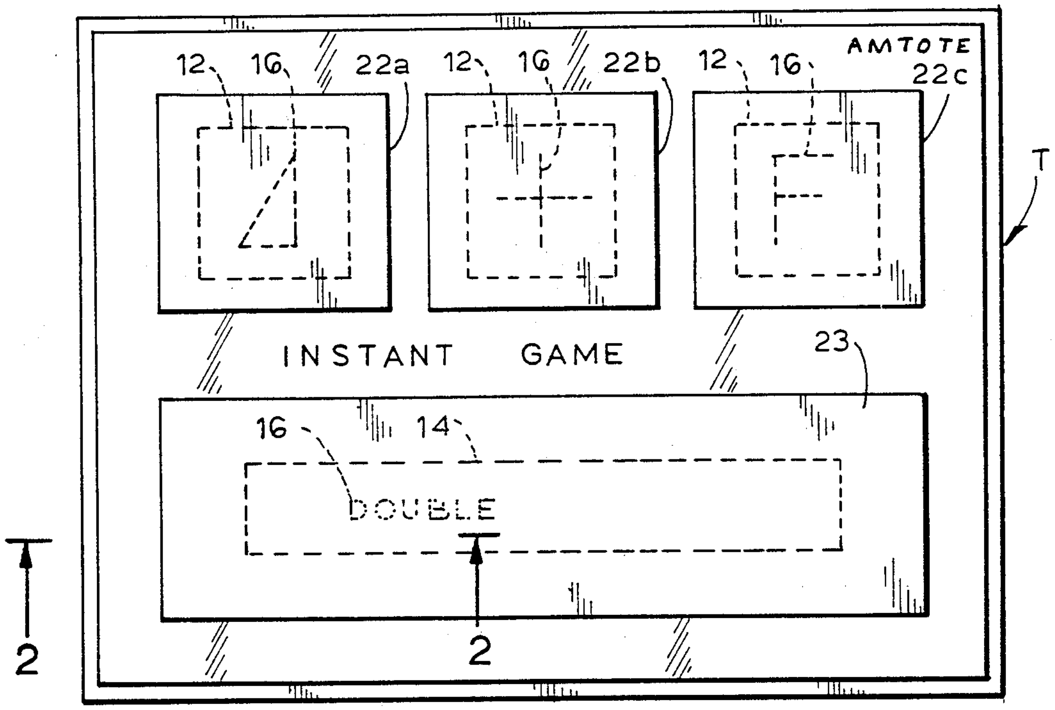
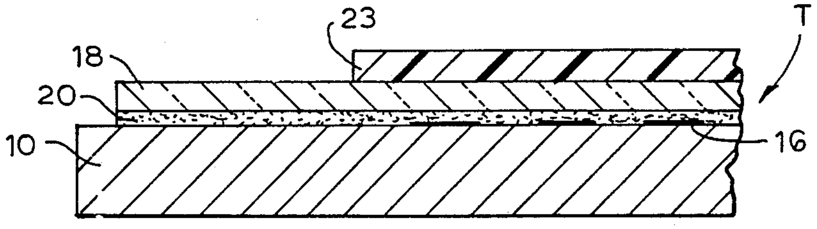
FIG. 2

METHOD FOR FABRICATING IMPRINTED TICKET WITH SCRATCH-OFF COATING

This is a division of co-pending application Ser. No. 912,915 filed on Sept. 29,1986 now U.S. Pat. No. 4,738,473.

The present invention relates to tickets, such as those used in wagering games or the like, and methods and apparatus for fabricating same and, more particularly, to an imprinted ticket with a scratch-off coating and a method and apparatus for fabricating same at a plurality of remote point of sale locations under the control of a central computer.

Many wagering games and the like, such as so-called "instant" lotteries, contests, promotional competitions and similar activities, utilize a ticket, card or other paper or light cardboard medium which is imprinted with indicia, such as information relating to certain numbers, symbols, words and the like which indicate whether the bearer has won a prize. Such tickets must obscure the win indicating information from observation by both the ticket distributor and the ticket purchaser as well until after the ticket has been sold. In this way, neither the ticket distributor nor the ticket purchaser can determine which of a large number of tickets contain the win indicating information. After the ticket is purchased, the purchaser determines if the purchased ticket is a winner by removing the material which obscures the imprinting thereon. This material is usually in the form of a coating of "scratch-off" paint which is silk screened or baked directly onto the ticket surface, over the imprinting thereon. Once this coating is removed, the purchaser can determine if he/she holds a winning ticket and, if so, can cash same in.

In some instances the ticket may have scratch-off coating material over several areas of the ticket, and in order to win, the area with a particular underlying indicia must be chosen first. If the coating over two or more areas has been removed, even if a win indicator is visible the ticket is void.

Because it is mandatory to maintain strict secrecy as to which of the tickets contain the win indicia, the obscuring coating must be affixed to the tickets prior to exposure and hence preferably immediately after imprinting. The application of the scratch-off coating requires a silk screening and/or baking process. The equipment for performing the necessary coating operation is large, messy, and expensive. It is not suitable for small scale use or operation by unskilled persons. Therefore it has not heretofore been possible to print this type of ticket at the various remote point of sale locations in the field. All of the tickets must be imprinted and coated at a central location and thereafter distributed.

Imprinting the tickets in a central location and then distributing them results in a large time lag between printing and distribution, creates security problems, and, in general, is slow and cumbersome. It would be far more preferable to be able to imprint and distribute the "instant winner" tickets with scratch-off coating in the same way as other types of tickets, that is, printed immediately prior to sale at a multitude of remote point of sale ticket-issuing locations under the control of a central computer. When this is done, only blank tickets need to be distributed to the various remote locations and no security problems exist. However, printing at point of sale has not been possible with this type of ticket because the scratch-off coating could not be applied with small, simple apparatus in the field. It is a general object of the present invention to overcome this problem.

It is, therefore, a prime object of the present invention to provide a novel imprinted ticket with a scratch-off coating.

It is another object of the present invention to provide a method and apparatus for fabricating imprinted tickets with a scratch-off coating at the point of sale.

It is another object of the present invention to provide an imprinted ticket with a scratch-off coating which includes an adhesive-backed clear plastic tape or label to which the coating is applied.

It is another object of the present invention to provide an imprinted ticket with a scratch-off coating which eliminates tampering.

It is another object of the present invention to provide a method and apparatus for fabricating imprinted tickets with a scratch-off coating in which the winners, and the amount, location and timing thereof can be determined by software and under the control of a central computer.

It is another object of the present invention to provide an imprinted ticket with a scratch-off coating which can be used in any pattern and can be easily adapted to any game format.

It is another object of the present invention to provide an imprinted ticket with a scratch-off coating wherein the coating is supplied on a clear plastic tape or label and can be used on any type of print and any type of paper.

It is another object of the present invention to provide a method and apparatus for fabricating imprinted tickets with a scratch-off coating wherein security is insured.

In accordance with one aspect of the present invention, tamper-proof means is provided for use with a base to form a ticket or the like. The base is of the type having a surface with a section adapted to printed with indicia. The means comprises a substantially transparent sheet. Adhesive means are provided for affixing the sheet to the base surface at a location over the imprinted section. Obvious damage to the base results if removal of the sheet is attempted. An opaque coating is provided on the exposed surface of the sheet overlying the imprinted section. The coating is adapted to be removed from the sheet to permit observation of the underlying imprinted indicia.

In accordance with another aspect of the present invention, a ticket or the like is provided comprising a base with a surface having a section adapted to have indicia imprinted thereon. A substantially transparent sheet is provided. Adhesive means are provided for affixing the sheet to the base surface at a location over the imprinted section. Obvious damage to the base results if removal of the sheet is attempted. An opaque coating is provided on the exposed surface of the sheet overlying the imprinted section. The coating is adapted to be removed from the sheet to permit observation of the underlying imprinted indicia.

The base preferably has preprinted material thereon. The sheet is preferably in the form of an adhesive-backed label or tape.

Preferably, the coating may be provided on acre than one area of the exposed surface. In addition, the blank surface may be imprinted in more than one section.

Each of the coated areas preferably overlies a different one of the imprinted sections.

In accordance with another aspect of the present invention, a method and apparatus are provided for fabricating a ticket or the like from a base and an opaque coated adhesive-backed transparent sheet. First, a base is dispensed and transferred to print means. Indicia are imprinted on a section of the surface of the base under the control of a centralized computer. The sheet is dispensed from a carrier and, thereafter, the sheet and base are aligned such that the opaque coating on the sheet covers the imprinted indicia on the base. The sheet is affixed to the base. Any attempt to remove the sheet from the base will result in obvious damage to the surface of the base. The opaque material is adapted to be removed to permit observation of the underlying indicia.

The fabricating apparatus is preferably enclosed to prevent observation of the imprinted section of the base surface until after the sheet has been affixed thereto. For convenience, the blank base may be imprinted with background material prior to the imprinting operation.

To these and to such other objects which may hereinafter appear, the present invention relates to an imprinted ticket with a scratch-off coating and a method and apparatus for fabricating same at point of sale, as set forth in the following specification and recited in the annexed claims, taken together with the accompanying drawings, wherein like numerals refer to like parts, and in which:

FIG. 1 is a front elevational view of a ticket fabricated in accordance with the method of the present invention;

FIG. 2 is an enlarged fragmentary cross-sectional view of the ticket of the present invention taken along line 2—2 of FIG. 1;

Figure 3:
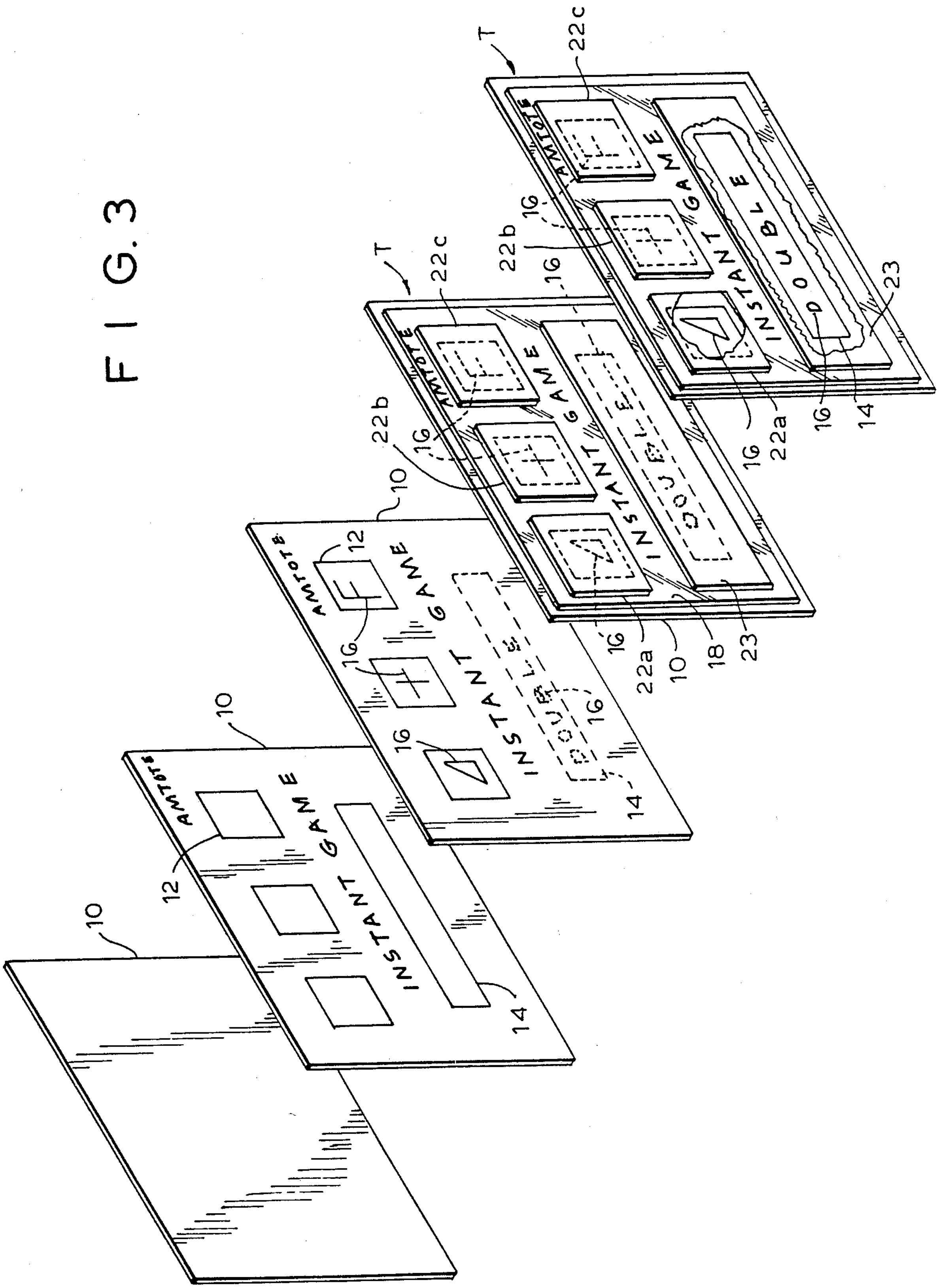
FIG. 3 is a series of isometric views showing the ticket of the present invention at various stages of fabrication and use.

Presently, "instant" lottery or wagering tickets and other types of game tickets which include opaque scratch-off coating covering win/lose information are printed in at a central location in large batches with the scratch-off material applied directly to the ticket, immediately after printing. The ability to print such tickets at a plurality of remote point of sale locations, such as retail stores, newsstands or supermarkets in the field, would avoid the burden of bulk distribution and the resulting security problems. Printing such tickets at the point of sale has, however, heretofore been impractical because the application of the scratch-off coating requires relatively bulky, expensive and complex equipment and extended drying times.

In general, the present invention relates to a ticket or the like which can be fabricated at the point of sale and, while maintained in secret, have a clear plastic label or tape, with scratch-off material on one surface, adhesively affixed thereto.

The present invention eliminates tampering with the tickets because any attempt to remove the coated tape results in obvious damage to the ticket surface so as to void same. It provides the system operator with a great deal of control over winning tickets and the amount; location and timing thereof can be completely controlled by software in a central computer. Further, if anything goes wrong with the printing cycle, the ticket can be withheld from issuance.

The areas upon which the scratch-off material is applied can be changed and, thus, the invention can be easily adapted to any game format. Moreover, the adhesive-backed label can be used on any type of print (impact, thermal, etc.) and on any type of paper base.

FIGS. 1 and 2 illustrate a ticket fabricated in accordance with the present invention. The ticket, generally designated T, includes a base 10 of paper or light cardboard material of the type conventionally used. Base 10 may be pre-cut to the required size and shipped to the point of sale fabricating apparatus in stacks. Alternatively, bases 10 may be provided in a roll and cut to size in situ by the ticket-issuing apparatus, immediately prior to printing.

The top surface of base 10 may be preprinted with words indicating the name of the game, the system operator's trademark, such as "AMTOTE", and with area borders such as squares 12 or rectangle 14. The preprinted ticket is then imprinted with certain symbols 16, such as words, signs, numbers, etc., pertaining to the winning and/or losing of the game. For example, the triangle, cross and "F" symbols which respectively appear in squares 12 or the word "DOUBLE" which appears in rectangle 14. In this case, symbols 16 may be indicative of winning the game, such as designating triangle to be a winner if this is the symbol which is first exposed. The word "DOUBLE" may indicate that the ticket is worth twice the normal amount. Obviously, the variations in the game rules and symbols used are endless and form no portion of the present invention.

A plastic sheet 18, preferably made of transparent polyester or the like, in the form of a strip, label or tape is affixed to the top surface of base 10 by means of a layer of adhesive 20, preferably situated on the undersurface of sheet 18. Adhesive 20 is preferably an acrylic type adhesive which has a relatively high tensile strength. Because of the high tensile strength of adhesive 20, any attempt to remove sheet 18 from base 10 will result in visible damage to the surface of base 10, hence voiding voiding the ticket.

Deposited on the exposed surface of sheet 18, in areas overlying the printed information 16, is a coating of so called scratch-off material 22. Material 22 may be deposited in a single area on the surface of sheet 18 or may be deposited in several spaced areas, such as areas ***22a*, *22b*, *22c* and 23**, shown in the drawings.

FIG. 3 illustrates the various steps in the fabrication and use of ticket T. The blank base 10 (figure in upper left as seen in the drawing) can be preprinted (figure second from left as seen in the drawing) with the name of the game, the system operator's logo, borders for the various printing, and any other appropriate information, prior to distribution, at a central location. The preprinted tickets are distributed to point of sale ticket-issuing apparatus which, at the time of sale, prints the game indicia 16 thereon in the appropriate areas (middle figure as seen in the drawing). Immediately after printing, and still within the same enclosed ticket-issuing apparatus, the clear plastic label 18 is affixed to the exterior surface of base 10 (figure second from the right as seen in the drawing). Label 18 is backed with adhesive 20 and has on the exterior surface thereof scratch-off material 22 in areas 22a 22b, 22c and 23 which cover imprinting 16, such that the game's indicia cannot be observed.

Several types of chemical coatings which can be used as scratch-off media 22 for the purposes set forth herein are commercially available. One such coating which has proved to function acceptably is known as "Scratch-Off Paint" and is available from K. C. Coatings of Kansas City, Mo. This coating is silk-screened on sheets 18 in the required configuration.

After the ticket T is sold, the purchaser chooses the one of the three top areas 22a, 22b or 22c where the winning information (triangle) 16 is believed to be present and scratches off the material coating obscuring same (rightmost figure as seen in the drawing). If the purchaser has guessed correctly and chosen the leftmost area 22a, overlying the triangle 16, he/she has chosen a winner. If so, he/she may then rub off material 23 on the lower area to determine how much he/she has won, in this instance double the normal amount.

Figure 4:
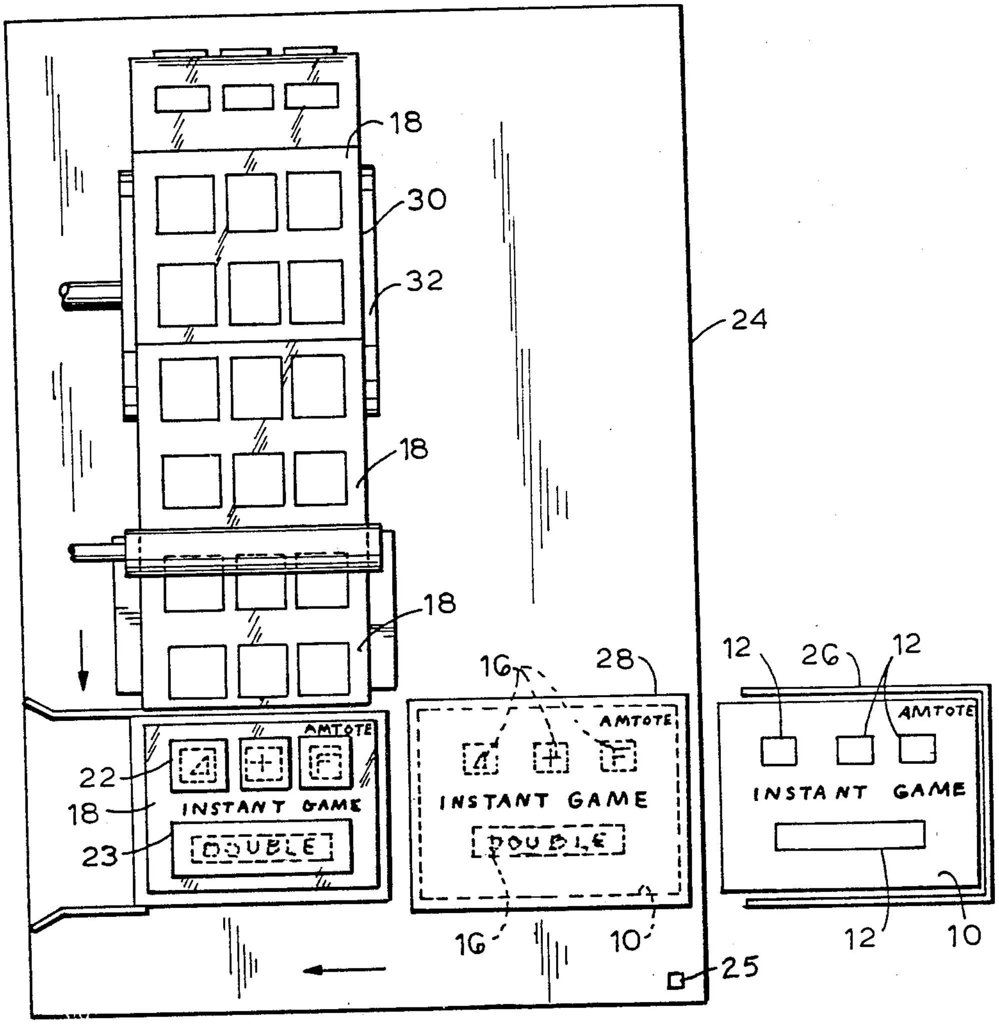
FIG. 4 is a top elevational view of apparatus designed to perform the method of the present invention.
Figure 5:
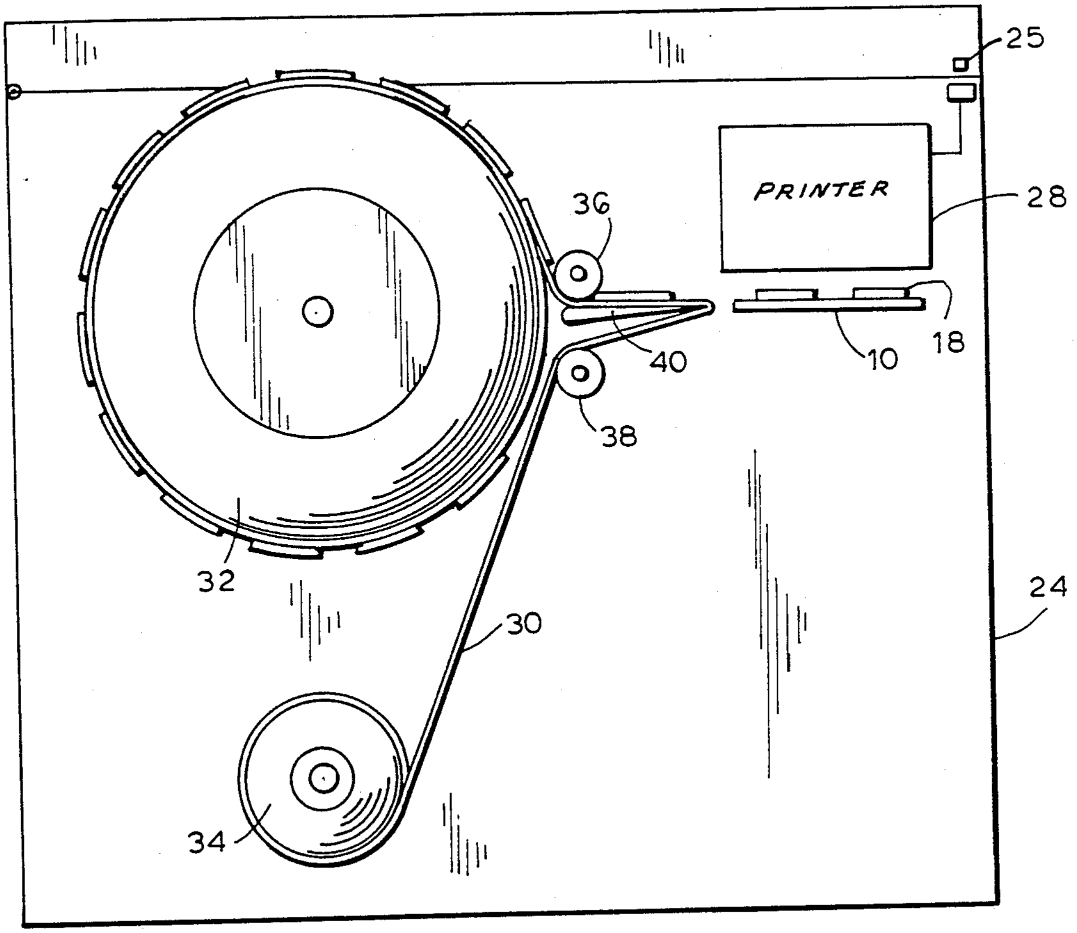
FIG. 5 is a side elevational view of the apparatus shown in FIG. 4.
Figure 6:
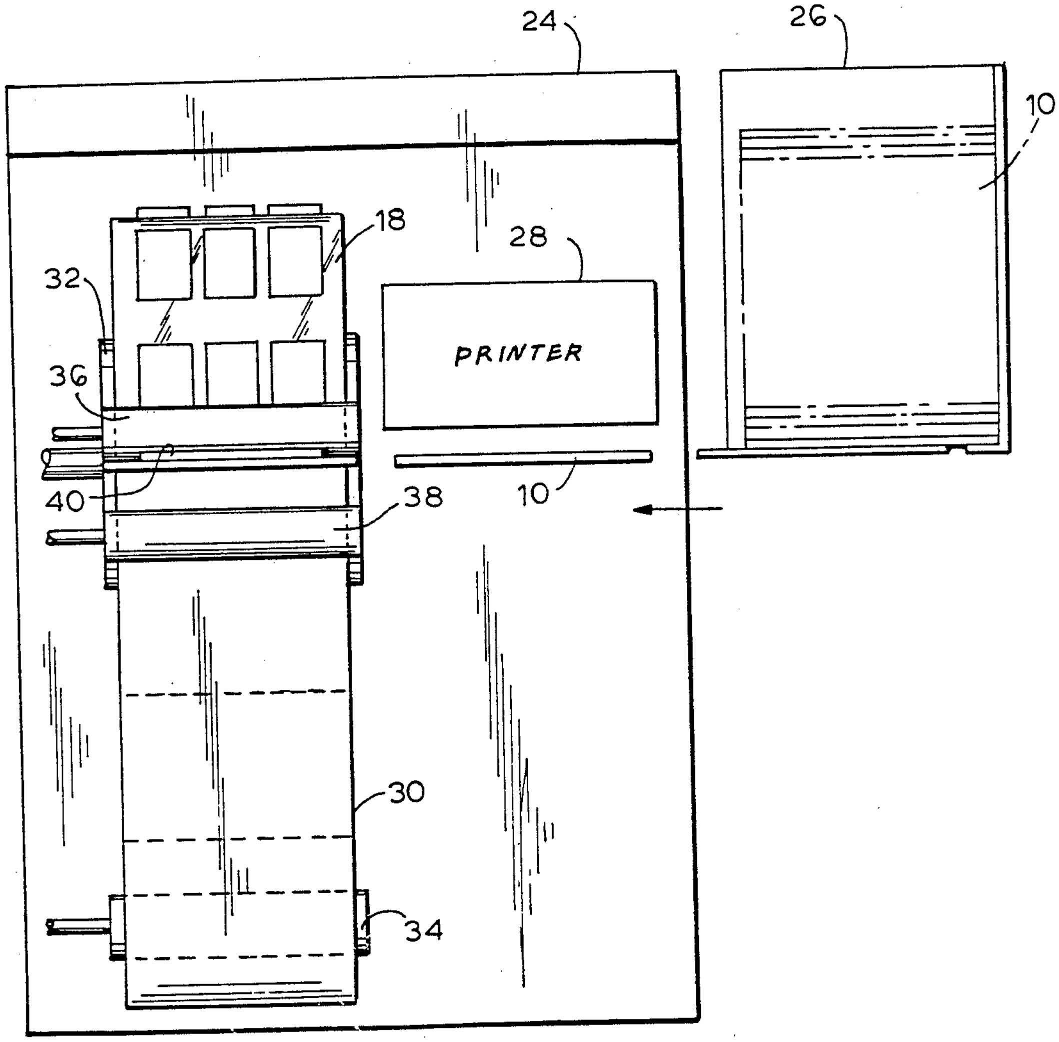
FIG. 6 is a front elevational view of the apparatus illustrated in FIG. 4.

The apparatus utilized in fabricating the above-described tickets is shown schematically in FIGS. 4, 5 and 6. In general, the apparatus comprises a secure tamper-proof enclosure 24 which is electrically connected to a central computer and which is preferably provided with an electronic sensing mechanism 25 of conventional design which will prevent the printing of a ticket unless the enclosure is closed. Situated adjacent to enclosure 24 is a stack retaining mechanism 26 of conventional design which retains a stack of preprinted bases 10 and dispenses same one at a time to enclosure 24. Stack retaining mechanism 26 may be exposed as shown or may be situated within enclosure 24. Instead of providing bases 10 in pre-cut form, it is possible to provide the bases on a roll and include a cutting mechanism (not shown) within enclosure 24 in order to cut the rolled material into appropriate sized bases 10.

Once inside enclosure 24, the preprinted base 10 passes through a conventional printer mechanism 28, preferably of the dot matrix type, which is under the control of a central computer. The computer decides which information 16 is to be imprinted on which bases 10. After imprinting information 16 on base 10, the imprinted base is transferred to a location, still within enclosure 24 and hidden from view, wherein a sheet 18 having scratchoff material 22 situated in the appropriate areas is affixed thereto. Sheet 18 is provided with an adhesive backing such that it can be applied directly to the surface of base 10 in a simple operation.

Sheet 18 may be provided in the form of labels on a strip carrier 30 which moves between a supply reel 32 and a take-up reel 34. Guide rollers 36, 38 and a stripper 40, all of conventional design, are provided to remove labels 18 from carrier 30 in a conventional fashion.

It will now be appreciated that the present invention relates to an imprinted ticket with scratchoff coating and a method and apparatus for fabricating same which permits instant lottery tickets or the like to be printed at remote point of sale locations in a secure and efficient manner. This is possible through the use of a tamper-proof, clear plastic label having an adhesive layer affixed to one side and scratch-off coating on the other. The label is affixed directly to the printed ticket prior to exposure thereof.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims:

We claim:

1. A method for fabricating a ticket from a base and opaque coated, adhesive-backed transparent sheet comprising the steps of:
   - dispensing a base and transferring same to print means;
   - imprinting indicia on a section of the surface of the base;
   - removing an oaque coated, adhesive-backed transparent sheet from a carrier;
   - aligning the sheet with the base such that the opaque coating covers the imprinted indicia; and
   - affixing the sheet to the base such that an attempt to remove same will result in obvious damage to the surface of the base; said opaque material being adapted to be removed so as to permit observation of the indicia.

2. The method of claim 1, further comprising the step of enclosing the fabricating operations so as to prevent observation of the imprinted section of the base surface until after the sheet has been affixed thereto.

3. The method of claim 1, further comprising the step of preprinting the base with background matter.

* * * * *